(12) United States Patent
Simon

(10) Patent No.: US 9,816,006 B2
(45) Date of Patent: Nov. 14, 2017

(54) COATING METHOD AND PANEL HAVING SUCH A COATING

(71) Applicant: SARL SIMON, Briec (FR)

(72) Inventor: Dominique Simon, Landrevarzec (FR)

(73) Assignee: SARL SIMON, Briec (FR)

( * ) Notice: Subject to any disclaimer, the term of this patent is extended or adjusted under 35 U.S.C. 154(b) by 344 days.

(21) Appl. No.: 14/654,541

(22) PCT Filed: Dec. 19, 2013

(86) PCT No.: PCT/FR2013/000352
§ 371 (c)(1),
(2) Date: Jun. 21, 2015

(87) PCT Pub. No.: WO2014/102465
PCT Pub. Date: Jul. 3, 2014

(65) Prior Publication Data
US 2015/0344724 A1   Dec. 3, 2015

(30) Foreign Application Priority Data
Dec. 24, 2012   (FR) .................................... 12 03591

(51) Int. Cl.
| C09D 175/04 | (2006.01) |
| B05D 1/38 | (2006.01) |
| C09D 163/00 | (2006.01) |
| C09D 7/12 | (2006.01) |
| B05D 7/00 | (2006.01) |
| C08K 13/02 | (2006.01) |
| B05D 7/16 | (2006.01) |

(52) U.S. Cl.
CPC ............. C09D 175/04 (2013.01); B05D 1/38 (2013.01); B05D 7/544 (2013.01); C09D 7/1216 (2013.01); C09D 7/1233 (2013.01); C09D 163/00 (2013.01); B05D 7/16 (2013.01); C08K 13/02 (2013.01); Y10T 428/24967 (2015.01)

(58) Field of Classification Search
CPC .... C08K 13/02; C09D 163/00; C09D 175/04; C09D 7/1216; C09D 7/1233; Y10T 428/24967; B05D 1/38; B05D 7/16; B05D 7/544
USPC .................................. 428/215; 427/290, 299
See application file for complete search history.

(56) References Cited

U.S. PATENT DOCUMENTS

| 2004/0109853 A1 * | 6/2004 | McDaniel ................ A62D 3/02 424/94.6 |
| 2009/0068473 A1 | 3/2009 | Van Wessel et al. |

FOREIGN PATENT DOCUMENTS

| FR | 2 915 690 A1 | 11/2008 | |
| NL | WO 2007054304 A1 * | 5/2007 | ........... C09D 163/00 |
| WO | 2007/054304 A1 | 5/2007 | |

* cited by examiner

*Primary Examiner* — Aaron Austin
*Assistant Examiner* — Alicia Sawdon
(74) *Attorney, Agent, or Firm* — IM IP Law; C. Andrew Im

(57) ABSTRACT

A coating process includes the successive steps of preparing the zone to be treated. At least one coat of a primer is applied to the prepared zone to obtain a thickness ranging from 100 to 450 micrometers. The zone to be treated is then reconditioned and a least one top coat is applied to obtain a thickness ranging from 100 to 450 micrometers.

16 Claims, 1 Drawing Sheet

COATING METHOD AND PANEL HAVING SUCH A COATING

RELATED APPLICATIONS

This application is a §371 application from PCT/FR2013/000352 filed Dec. 19, 2013, which claims priority from French Patent Application No. 12 03591 filed Dec. 24, 2012, each of which is herein incorporated by reference in its entirety.

TECHNICAL FIELD OF THE INVENTION

The present invention relates to a painting process directed toward the renovation of walls such as those of biological or pharmaceutical research laboratories, agrifood or cosmetic production sites, and premises used by the microelectronics, aeronautical or even nuclear industry, often known as clean rooms.

BACKGROUND OF THE INVENTION

These zones to be treated consist of several plate metal panels. Renovating the panels avoids the need for total dismantling of the various parts of the clean room, followed by its reassembly. The handling time is long since these panels are fixed to rails which are themselves fixed to the walls and often nested into the ceiling and the floor resin of the building. Repair without dismantling appears to be a simpler solution since it avoids the need for suspending, for a certain time, the activity of the clean rooms.

Hydrogen peroxide is used for disinfecting clean rooms. Hydrogen peroxide is the replacement for formaldehyde, the use of which was stopped by decree following the order of Jan. 5, 1993. Hydrogen peroxide, also known as aqueous hydrogen peroxide solution, allows sterilization, i.e. the total destruction of all microorganisms, including bacterial spores, and disinfection, i.e. the destruction and removal of specific types of microorganisms.

Hydrogen peroxide is used in gaseous form. For example, liquid 30% hydrogen peroxide is vaporized to obtain about 1200 ppm. The vapor splits into water and non-toxic oxygen and affords a sterilizing action for decontaminating the equipment and materials of confinement laboratories.

The partition walls of clean rooms must meet performance standards imposed by the constraints for controlling this contamination. This is why the surface state of the panels must be maintained over time. However, it arises that activity-related incidents compromise these performance standards due to scratching or chemical impairment of the surface. For example, during the decontamination phase, scratches cause the paint of the panels to blister, and, over time, it will flake off.

Document FR 2 915 690 describes a process for painting a non-metallic support, comprising steps of sanding to make the support smooth, the application of several coats of motor vehicle primer diluted to about 50%, sanding before each coat, the application of motor vehicle bodywork caulking compound to even out defects in the support, the application of a coat of varnish and buffing. By means of this process, a smooth, water-repellent, glossy and resistant surface state is found. However, this process cannot be adapted to the sheet metal of the panels of a clean room since they are metallic. Furthermore, this process is not suited to withstanding decontamination with hydrogen peroxide.

The aim of the present invention is to overcome these drawbacks and to propose a process for repairing and renovating panels forming a clean room, while at the same time withstanding decontamination with hydrogen peroxide.

OBJECT AND SUMMARY OF THE INVENTION

The invention relates to a coating process comprising the following successive steps:
a) preparation of the zone to be treated,
b) application of at least one coat of a primer until a thickness of about from 100 to 450 micrometers is obtained, said coat of primer being composed of at least 10 volumes of epoxy, 2 volumes of hardener and between 0 and 2 volumes of diluent, the epoxy of which comprises at least the following ingredients given as mass concentrations relative to the total volume of epoxy:
xylene: 10-25%,
epoxy resin 700<mean mw<1100: 10-25%,
zinc phosphate: 2.5-10%,
1-methoxy-2-propanol: 2.5-10%,
epoxy resins mean mw<700: 2.5-10%,
ethylbenzene: 2.5-10%,
heavy naphtha hydrodesulfide: 1-2.5%,
light aromatic naphtha: <1%,
c) reconditioning of the zone to be treated,
d) application of a top coat until a thickness of about from 100 to 450 micrometers is obtained, said top coat being composed of at least 2 volumes of polyurethane, 1 volume of a hardener and between 0 and 10% of a diluent, the polyurethane of which comprises at least the following ingredients given as mass concentrations relative to the total volume of polyurethane:
2-methoxy-1-methylethyl acetate: 10-25%,
n-butyl acetate: 2.5-10%,
light aromatic naphtha: 1-2.5%,
isobutyl acetate: 1-2.5%,
heavy naphtha hydrodisulfide: 1-2.5%.

The coating process thus described makes it possible to withstand decontamination with hydrogen peroxide. Said process concerns a process for coating clean room walls. A clean room is a room or a series of rooms in which the particle concentration is controlled so as to minimize the introduction, generation or retention of particles therein, generally for a specific industrial or research purpose.

The thickness of the coat of primer and the thickness of the top coat ensure considerable longevity in addition to withstanding decontamination with hydrogen peroxide.

The specific choice of the composition of the coat of primer and of the top coat makes it possible to withstand decontamination with hydrogen peroxide.

The repair of these panels without dismantling affords a considerable saving in time compared with the complete dismantling of a room.

This process makes it possible to perform a large number of interventions:
  the renovation of a sandwich panel, for instance rock wool between two flat or ribbed metal plates, or made of polyethylene, laminate, compressed wood, etc.,
  the restoration of doors, especially fire doors, metal-plated doors, isothermal doors, etc.,
  the repair of interior and exterior wall cladding,
  the laying of polyethylene panels, traditional panels, doors, door frames, etc.,
  the painting of mechanical, electronic, military, nuclear, etc. components.

Preferably, step a) consists in de-siliconizing, sanding or stripping the zone to be treated and then cleaning and degreasing the zone to be treated.

Preferably also, step c) consists in leaving to dry for a minimum of 48 hours, sanding the coat of primer to make it smooth and rinsing the primer with clean water and then wiping and blotting dry with a tack cloth so as to remove the dust.

According to another aspect of the invention, during step b) or during step d), the hardener comprises at least the following ingredients given as mass concentrations relative to the total volume of the hardener:
xylene: 10-25%,
C8 aromatic hydrocarbons: 10-25%,
ethylbenzene: 2.5-10%,
2,4,6-trisphenol: 2.5-10%,
3,6-diazaoctane-1,8-diamine: 2.5-10%,
butanol: 1-2.5%.

According to one variant, during step b) or during step d), the hardener comprises at least the following ingredients, given as mass concentrations relative to the total volume of the hardener:
C8 aromatic hydrocarbons: 25-50%,
1,6-hexamethylene diisocyanate homopolymer: 25-50%,
2-methoxy-1-methylethyl acetate: 10-25%,
hexamethylene diisocyanate: <0.5%.

According to another variant, during step b) or during step d), the diluent comprises at least the following ingredients, given as mass concentrations relative to the total volume of the diluent:
isobutyl acetate: 25-50%,
C8 aromatic hydrocarbons: 25-50%,
2-methoxy-1-methylethyl acetate or acetone: 10-25%.

Also, according to another variant, during step b) or during step d), the diluent comprises at least the following ingredients, given as mass concentrations relative to the total volume of the diluent:
isobutyl acetate: 10-25%,
C9 aromatic hydrocarbons: 25-50%,
2-methoxy-1-methylethyl acetate: 25-50%,
2-methoxypropyl acetate: <0.5%.

According to a preference, during step b) or during step d), the diluent comprises at least the following ingredients, given as mass concentrations relative to the total volume of the diluent:
C8 aromatic hydrocarbons: 50-75%,
butanol: 25-50%,
4-methylpentan-2-one: 10-25%.

According to another preference, during step b), the coat of primer is applied with a spray gun in crossed coats and, during step d), the top coat is applied with a spray gun in crossed coats, preferably in crossed coats that are oblique relative to the floor. Thus, the direction of painting is concealed from view.

The invention also relates to a panel covered with such a coating.

BRIEF DESCRIPTION OF THE FIGURES

Other characteristics and advantages of the invention will emerge in the light of the description that follows, which is given on the basis of the attached drawings. These examples are given in a nonlimiting manner. The description is to be read in relation with the attached drawings, in which.

DESCRIPTION OF EMBODIMENTS OF THE INVENTION

The invention relates to a coating process and notably a panel coating process.

The zone to be treated must take into account the constraints of a dust-free room. First, the zone to be treated is equipped with plastic-coated tarpaulins to protect the rest of the room from any dust or projection of paint. The air-conditioning and lighting fixtures are concealed and ventilation is possibly installed at the safety exits by means of exhaust ducts. These elements are all arranged as a function of the implantation of the premises and the extent of the zones to be treated.

During the polluting operations such as the dusting step and the application of a coat of paint, it is necessary to limit the emission of particles.

For example, sanding is performed using pneumatic suction sanders whose outlet is equipped with a filter, which limits the production of dusts.

Figure 1:
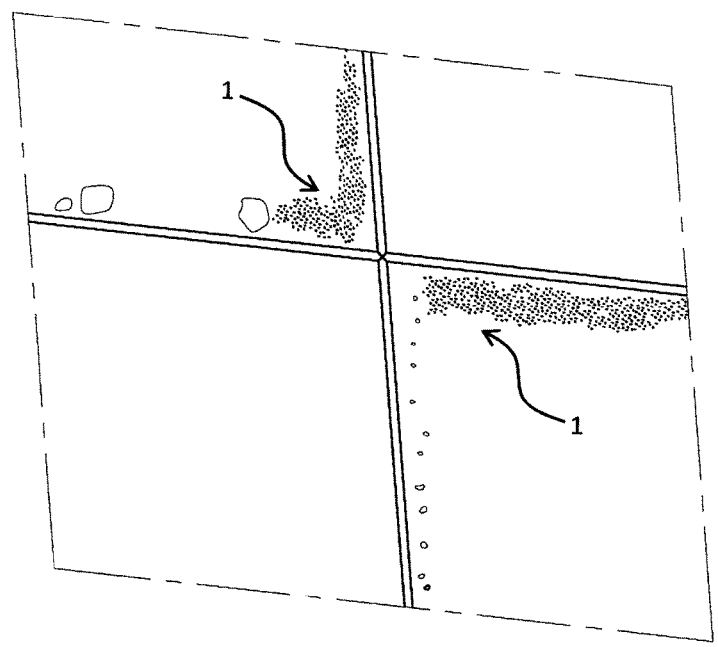
FIG. 1 is a view of a panel that has been deteriorated by decontamination with hydrogen peroxide.

FIG. 1 shows the damage 1 associated with decontamination with hydrogen peroxide.

When the panel is damaged by decontamination or decontamination with hydrogen peroxide, sanding is performed to a deeper level until no more paint remains so as to see the plate metal of the panel to be coated. If the panel is not damaged, the sanding may be superficial.

The zone to be treated may be prepared by using a degreasing agent having a low density such as 0.86.

Figure 2:
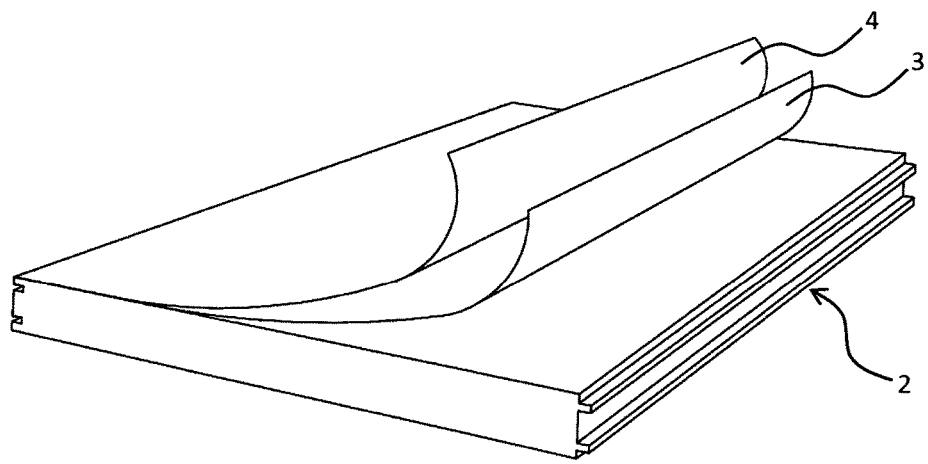
FIG. 2 is a perspective view of a panel bearing a coating according to the invention.

FIG. 2 shows the application of the process to a panel 2 and especially step b) of applying at least one coat of a primer 3 until a thickness of about from 150 to 450 micrometers is obtained, and step d) of applying at least one top coat 4 until a thickness of about from 150 to 450 micrometers is obtained.

For example, the panel 2 consists of two metal plates and of rock wool between the two metal plates. The application of the coat of primer is repeated four times to obtain a coat of 300 micrometers and the application of the top coat is repeated four times to obtain a coat of 300 micrometers.

For example, the coat of primer 3 is composed of 10 volumes of epoxy and 2 volumes of hardener. The epoxy is composed of 25% (10-25%) of xylene, 25% (10-25%) of epoxy resins 700<mean mw<1100, 10% (2.5-10%) of zinc phosphate, 10% (2.5-10%) of 1-methoxy-2-propanol, 10% (2.5-10%) of epoxy resins mean mw<700, 10% (2.5-10%) of ethylbenzene, 2.5% (1-2.5%) of heavy naphtha hydrodisulfide and 0.8% (<1%) of light aromatic naphtha. The rest of the epoxy is diluent to make the volume of epoxy up to 100%. The hardener of the coat of primer is composed of 25% (10-25%) of xylene, 25% (10-25%) of C8 aromatic hydrocarbons, 10% (2.5-10%) of ethylbenzene, 10% (2.5-10%) of 2,4,6-tris(dimethylaminomethyl)phenol, 10% (2.5-10%) of 6-diazaoctane-1,8-diamine and 2.5% (1-2.5%) of butanol. According to one variant, use is made of a hardener whose composition is as follows: 40% (25-50%) of C8 aromatic hydrocarbons, 40% (25-50%) of 1,6-hexamethylene diisocyanate homopolymer, 10% (10-25%) of 2-methoxy-1-methylethyl acetate, 0.4% (<0.5%) of hexamethylene diisocyanate. The rest of the hardener is diluent to make the volume of hardener up to 100%. Preferably, the diluent is composed of 75% (50-75%) of C8 aromatic hydrocarbons, 50% (25-50%) of butanol and 25% (10-25%) of 4-methylpentan-2-one, also known as methyl isobutyl ketone. In one variant, the diluent is composed of 25% (10-25%) of isobutyl acetate, 25% (25-50%) of C9 aromatic hydrocarbons, 49.8% (25-50%) of 2-methoxy-1-methylethyl acetate and 0.2% (<0.5%) of 2-methoxypropyl acetate.

For example, the top coat 4 is composed of 2 volumes of polyurethane and 1 volume of a hardener. The polyurethane is composed of 25% (10-25%) of 2-methoxy-1-methylethyl acetate, 10% (2.5-10%) of n-butyl acetate, 2.5% (1-2.5%) of light aromatic naphtha, 2.5% (1-2.5%) of isobutyl acetate and 2.5% (1-2.5%) of heavy naphtha hydrodisulfide. The rest of the polyurethane is diluent to make the volume of polyurethane up to 100%. The hardener of the top coat is composed of 40% (25-50%) of C8 aromatic hydrocarbons, 40% (25-50%) of 1,6-hexamethylene diisocyanate homopolymer, 10% (10-25%) of 2-methoxy-1-methylethyl acetate, 0.4% (<0.5%) of hexamethylene diisocyanate. According to one variant, use is made of a hardener whose composition is as follows: 25% (10-25%) of xylene, 25% (10-25%) of C8 aromatic hydrocarbons, 10% (2.5-10%) of ethylbenzene, 10% (2.5-10%) of 2,4,6-tris(dimethylaminomethyl)phenol, 10% (2.5-10%) of 6-diazaoctane-1,8-diamine and 2.5% (1-2.5%) of butanol. The rest of the hardener is diluent to make the volume of hardener up to 100%. Preferably, the diluent is composed of 50% (25-50%) of isobutyl acetate, 30% (25-50%) of C8 aromatic hydrocarbons and 20% (10-25%) of 2-methoxy-1-methylethyl acetate. According to one variant, the diluent is composed of 50% (25-50%) of isobutyl acetate, 30% (25-50%) of C8 aromatic hydrocarbons and 20% (10-25%) of acetone, or, according to another variant, the diluent is composed of 25% (10-25%) of isobutyl acetate, 25% (25-50%) of C9 aromatic hydrocarbons, 49.8% (25-50%) of 2-methoxy-1-methylethyl acetate and 0.2% (<0.5%) of 2-methoxypropyl acetate.

The paint is used with a low-pressure spray gun for the panels, dropped ceilings and doors, in several crossed coats until a perfectly smooth finish is obtained.

The following tests show the resistance to chemical attack of the coating process. Seven steel plates are coated with a coat of white paint whose thickness is measured, in accordance with standard NF T 30124. The results are presented in the table below:

| Sample ref. | Coating thickness | | | |
| --- | --- | --- | --- | --- |
| | Min. | Max. | Mean | Standard deviation |
| 1 | 203 | 232 | 219 | 6 |
| 2 | 190 | 228 | 219 | 12 |
| 3 | 185 | 212 | 199 | 9 |
| 4 | 196 | 217 | 204 | 6 |
| 5 | 193 | 225 | 210 | 6 |
| 6 | 182 | 204 | 195 | 6 |
| 7 | 188 | 216 | 208 | 7 |

The test consists in testing the resistance of the coating to the contact of hydrogen peroxide as a 35-volumes aqueous hydrogen peroxide solution deposited on the plates laying horizontally, either in the form of drops about 5 mm in diameter, or as fine droplets sprayed in the form of a fog.

In practice, the aqueous hydrogen peroxide solution, sprayed by misting, becomes deposited on the walls. The test thus consisted in exposing the plates to a fog of aqueous hydrogen peroxide solution to obtain a coverage with fine droplets. These tests were thus performed with a test that is more severe than in practice. Specifically, the active oxygen which degrades the coating exists only in the liquid phase. Drops with a mean diameter of about 5 mm were thus deposited on the plates so as to prolong the contact with the aqueous hydrogen peroxide solution.

This table (above) shows tests performed under extreme conditions with a particle content of 2000/ppm. The acceptable minimum is thus a thickness of 182 micrometers (comprising both the priming and top coats). Applying a coat of primer of a minimum of 100 micrometers and a top coat of a minimum of 100 micrometers ensures a minimum coating thickness of 200 micrometers. Thus, the coating process ensures good resistance over time and makes it possible to withstand decontamination with hydrogen peroxide. The minimum thickness of 200 micrometers, as indicated in the coating process, makes it possible largely to withstand decontamination with hydrogen peroxide. Conventionally, the decontamination phase takes place with a particle content of between 50 and 450/ppm. The particle content is markedly lower than in the tests performed with a particle content of 2000/ppm. In this manner, the thickness of the two combined coats (coat of primer and top coat, minimum of 200 micrometers) is thus sufficient to withstand the phase of decontamination with hydrogen peroxide.

The maximum thickness of 900 micrometers for the two combined coats (thickness of the coat of primer: 450 micrometers, and thickness of the top coat: 450 micrometers) is justified from an economic aspect. Specifically, adding further thickness is more expensive in terms of the amount of primer or top coat. This is why exceeding this thickness is not advantageous from an economic viewpoint.

A visual examination and a fingernail scratch test are performed on each contact zone as specified in the table below:

Results observed after deposition in the form of drops:

| Contact time | Observations |
| --- | --- |
| 2 h | nothing to report visually |
| | absence of blistering |
| | no change in nail scratch hardness |
| 4 h | nothing to report visually, slight ring visible only under incident light |
| | absence of blistering |
| | no change in nail scratch hardness |
| 6 h | nothing to report visually, slight ring visible only under incident light |
| | absence of blistering |
| | no change in nail scratch hardness |
| 7 h | slightly visible imprint |
| | absence of blistering |
| | surface scratchable by nail |
| 8 h | slightly visible imprint |
| | appearance of small blisters at the end of wiping; the size of the blisters increases over time after wiping |
| | surface scratchable by nail |
| ≥9 h | the aqueous hydrogen peroxide solution evaporated |
| | at the place where the drop landed, the presence of a large blister is noted, blistering between the top coat and the primer, the primer adhering to the support |

To perform these tests, drops of aqueous hydrogen peroxide solution were deposited as often as necessary to see the effect of the aqueous hydrogen peroxide solution on a plate bearing the coating over time.

When a fog of 35-volumes aqueous hydrogen peroxide solution is sprayed onto a plate at a rate of about 20 mg/100 cm$^2$, it evaporates totally after leaving to stand for 30 minutes at 23° C.

The coating shows no visual defects or any change in nail scratch hardness. The coating shows satisfactory resistance to hydrogen peroxide at 23° C. for contact times of less than 6 hours. Spraying with hydrogen peroxide, in the form of a fine fog, does not cause any disorder. The contact time is limited due to the rapid evaporation of the product. This coating process applied to the panels gives rooms that withstand decontamination with hydrogen peroxide.

The invention claimed is:

1. A coating process comprising the successive steps of:
preparing a zone to be treated;
applying at least one coat of a primer to obtain a thickness ranging from 100 to 450 micrometers, the primer is composed of at least 10 volumes of an epoxy, 2 volumes of a hardener and between 0 and 2 volumes of a diluent, the epoxy comprises at least the following ingredients given as mass concentrations relative to a total volume of epoxy:
xylene: 10-25%;
epoxy resin 700<mean mw<1100: 10-25%;
zinc phosphate: 2.5-10%;
1-methoxy-2-propanol: 2.5-10%;
epoxy resins mean mw<700: 2.5-10%;
ethylbenzene: 2.5-10%; and
heavy naphtha hydrodesulfide: 1-2.5%;
light aromatic naphtha: <1%;
reconditioning the zone to be treated;
applying a top coat to obtain a thickness ranging from 100 to 450 micrometers, the top coat is composed of at least 2 volumes of a polyurethane, 1 volume of the hardener and between 0 and 10% of the diluent, the polyurethane comprises at least the following ingredients given as mass concentrations relative to a total volume of polyurethane:
2-methoxy-1-methylethyl acetate: 10-25%;
n-butyl acetate: 2.5-10%;
light aromatic naphtha: 1-2.5%;
isobutyl acetate: 1-2.5%; and
heavy naphtha hydrodisulfide: 1-2.5%.

2. The coating process as claimed in claim 1, wherein the step of preparing the zone to be treated comprises the steps of de-siliconizing, sanding or stripping the zone to be treated; and then cleaning and degreasing the zone to be treated.

3. The coating process as claimed in claim 1, wherein the step of reconditioning comprises the steps of step leaving the zone to be treated to dry for a minimum of 48 hours; sanding said at least one coat of the primer to smooth said at least one coat of the primer; rinsing said at least one coat of the primer with clean water; then wiping and blotting said at least one coat of the primer dry with a tack cloth to remove dust.

4. A coating process as claimed in claim 1, wherein the hardener of the primer comprises at least the following ingredients given as mass concentrations relative to a total volume of the hardener:
xylene: 10-25%;
C8 aromatic hydrocarbons: 10-25%;
ethylbenzene: 2.5-10%;
2,4,6-tris(dimethylaminomethyl)phenol: 2.5-10%;
3,6-diazaoctane-1,8-diamine: 2.5-10%; and
butanol: 1-2.5%.

5. A coating process as claimed in claim 1, wherein the hardener of the top coat comprises at least the following ingredients given as mass concentrations relative to a total volume of the hardener:
xylene: 10-25%;
C8 aromatic hydrocarbons: 10-25%;
ethylbenzene: 2.5-10%;
2,4,6-tris(dimethylaminomethyl)phenol: 2.5-10%;
3,6-diazaoctane-1,8-diamine: 2.5-10%; and
butanol: 1-2.5%.

6. A coating process as claimed in claim 1, wherein the hardener of the primer comprises at least the following ingredients given as mass concentrations relative to a total volume of the hardener:
C8 aromatic hydrocarbons: 25-50%;
1,6-hexamethylene diisocyanate homopolymer: 25-50%;
2-methoxy-1-methylethyl acetate: 10-25%; and
hexamethylene diisocyanate: <0.5%.

7. A coating process as claimed in claim 1, wherein the hardener of the top coat comprises at least the following ingredients given as mass concentrations relative to a total volume of the hardener:
C8 aromatic hydrocarbons: 25-50%;
1,6-hexamethylene diisocyanate homopolymer: 25-50%;
2-methoxy-1-methylethyl acetate: 10-25%; and
hexamethylene diisocyanate: <0.5%.

8. A coating process as claimed in claim 1, wherein the dilulent of the primer comprises at least the following ingredients given as mass concentrations relative to a total volume of the diluent:
isobutyl acetate: 25-50%;
C8 aromatic hydrocarbons: 25-50%; and
2-methoxy-1-methylethyl acetate or acetone: 10-25%.

9. A coating process as claimed in claim 1, wherein the dilulent of the top coat comprises at least the following ingredients given as mass concentrations relative to a total volume of the diluent:
isobutyl acetate: 25-50%;
C8 aromatic hydrocarbons: 25-50%; and
2-methoxy-1-methylethyl acetate or acetone: 10-25%.

10. A coating process as claimed in claim 1, wherein the diluent of the primer comprises at least the following ingredients given as mass concentrations relative to a total volume of the diluent:
isobutyl acetate: 10-25%;
C9 aromatic hydrocarbons: 25-50%;
2-methoxy-1-methylethyl acetate: 25-50%; and
2-methoxypropyl acetate: <0.5%.

11. A coating process as claimed in claim 1, wherein the diluent of the top coat comprises at least the following ingredients given as mass concentrations relative to a total volume of the diluent:
isobutyl acetate: 10-25%;
C9 aromatic hydrocarbons: 25-50%;
2-methoxy-1-methylethyl acetate: 25-50%; and
2-methoxypropyl acetate: <0.5%.

12. A coating process as claimed in claim 1, wherein the diluent of the primer comprises at least the following ingredients given as mass concentrations relative to a total volume of the diluent:
C8 aromatic hydrocarbons: 50-75%;
butanol: 25-50%; and
4-methylpentan-2-one: 10-25%.

13. A coating process as claimed in claim 1, wherein the diluent of the top coat comprises at least the following ingredients given as mass concentrations relative to a total volume of the diluent:
C8 aromatic hydrocarbons: 50-75%;
butanol: 25-50%; and
4-methylpentan-2-one: 10-25%.

14. The coating process as claimed in claim 1, further comprising the steps of applying said at least one coat of primer with a spray gun in crossed coats; and applying the top coat with the spray gun in the crossed coats.

15. The coating process as claimed in claim 14, wherein the crossed coats are oblique relative to a floor.

16. A panel covered with a coating, the coating comprises:
at least one coat of a primer with a thickness ranging from 100 to 450 micrometers, the primer is composed of at least 10 volumes of an epoxy, 2 volumes of a hardener and between 0 and 2 volumes of a diluent, the epoxy comprises at least the following ingredients given as mass concentrations relative to total volume of epoxy:
xylene: 10-25%;
epoxy resin 700<mean mw<1100: 10-25%;
zinc phosphate: 2.5-10%;
1-methoxy-2-propanol: 2.5-10%;
epoxy resins mean mw<700: 2.5-10%;
ethylbenzene: 2.5-10%; and
heavy naphtha hydrodesulfide: 1-2.5%;
light aromatic naphtha: <1%; and
a top coat with a thickness ranging from 100 to 450 micrometers, the top coat is composed of at least 2 volumes of a polyurethane, 1 volume of the hardener and between 0 and 10% of the diluent, the polyurethane comprises at least the following ingredients given as mass concentrations relative to a total volume of polyurethane:
2-methoxy-1-methylethyl acetate: 10-25%;
n-butyl acetate: 2.5-10%;
light aromatic naphtha: 1-2.5%;
isobutyl acetate: 1-2.5%;
heavy naphtha hydrodisulfide: 1-2.5%.

* * * * *